United States Patent Office 3,271,176
Patented Sept. 6, 1966

3,271,176
COMPOSITION OF MATTER COMPOSED OF A CYANOETHYLATED CELLULOSIC MATERIAL AND AN INORGANIC PHOTOCHROMIC MATERIAL
John A. Chopoorian, Stamford, Conn., assignor to American Cyanamid Company, Stamford, Conn., a corporation of Maine
No Drawing. Filed Nov. 21, 1962, Ser. No. 239,324
13 Claims. (Cl. 106—193)

This invention relates to novel compositions of matter. More particularly, this invention relates to novel compositions of matter comprising cyanoethylated cellulosic materials having uniformly dispersed throughout the body thereof, an inorganic photochromic material. Still more particularly, this invention relates to novel compositions of matter comprising cyanoethylated cellulose having uniformly dispersed throughout the body thereof, a photochromic material comprising various inorganic metal oxides.

Photochromic materials are known and have been used as the active ingredients in such articles as data storage devices, reflectants for incident high-intensity radiation, photochemical printing and the like. There has, however, to my knowledge been no disclosure of the production of compositions of matter comprising highly stable, very sensitive, rapid color-changing photochromic materials uniformly dispersed throughout cyanoethylated cellulosic materials.

I have now discovered that certain metal oxide photochromic materials may be directly and uniformly incorporated into various cyanoethylated cellulosic materials by either (1) carrying out the cyanoethylation of the cellulosic material in the presence of the photochromic material or (2) physically blending or admixing the cyanoethylated cellulosic material with the photochromic material, such as by the use of a three-roll mill. It was indeed surprising and unexpected to find that the photochromic inorganic oxides still functioned efficiently after having been dispersed throughout the solid media. It is well known that many solid inorganic photochromic materials which change their color in the solid state, do not continue to function as photochromic materials after having been dispersed throughout a solid binder. For example, $TiO_2$ doped with an iron oxide, functions as a photochromic material in the pure solid state, however, upon incorporation thereof into a solid glass binder, will not change color upon contact with ultraviolet rays.

However, I have discovered novel compositions of matter comprising cyanoethylated cellulosic materials containing certain inorganic metal oxides, in uniform molecular distribution, which continue to function as photochromic materials upon contact with irradiation, i.e. ultraviolet light. These novel compositions thereby permit the temporary recording of data, images, or designs and the production of various articles heretofore not possible utilizing prior art products. Additionally, the products are produced in an easily-handled state.

The prior art devices of this type present many deficiencies and problems which have heretofore been very difficut to overcome. In regard to various commercially available storage devices and photographic instruments for instance, the light sensitive material must be prevented from coming into contact with white light, such as by storage in the dark or by coating the material with a protective film, such as a gel or tin foil etc. The compositions of my invention, however, need only be removed from the light a short time before use in order to be transformed back to their original color if they previously have come into contact with ultraviolet light. Additionally, these prior art devices decompose rapidly because of their relatively poor stability and therefore must be used within a certain date after their manufacture. However, the novel compositions of matter of the present invention are very stable, easily handled, can be stored for extended periods of time without fear of damage by white light and still possess all the properties necessary and desired for the above-enumerated uses.

The novel compositions of my invention are moldable, castable etc. by all known techniques into discs, plates, films, foils, fibers and the like. Since the color change of the photochromic compounds, more fully discussed hereinbelow, is evident in the solid state in admixture with the cyanoethylated cellulosic materials, the necessity of laminated construction and/or encapsulation and their accompanying disadvantages in the use of other photochromic materials have been obviated by my novel compositions.

It is an object of the present invention to provide novel compositions of matter.

It is a further object of the present invention to provide novel compositions of matter comprising cyanoethylated cellulosic materials having uniformly dispersed throughout the body thereof, an inorganic photochromic material.

It is a further object of the present invention to provide novel compositions of matter comprising cyanoethylated cellulose, in any of its forms, having uniformly dispersed therethrough, a photochromic material comprising various inorganic metal oxides.

These and other objects will become more apparent to those skilled in the art upon reading the more detailed description of my invention set forth hereinbelow.

As mentioned above, molecules or complexes which undergo reversible photo-induced color changes are termed photochromic systems. That is to say, in the absence of activating radiation, the system has a single stable electronic configuration with a charcateristic absorption spectrum. When the system is contacted with ultraviolet irradiation the absorption spectrum for the system changes drastically, but when the irradiation source is removed the system reverts to its original state.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

A. ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the screening coefficients of other components of the system, and the wavelengths of the incident radiation.

B. QUANTUM YIELD

All excited molecules will not undergo transformation to the colored form, so that the quantum yield will generally be less than unity. Various deactivating processes which compete for the excited molecules include fluorescence, phosphorescence, permanent chemical change and thermal release.

C. THE REVERSE REACTION

In both the forward and reverse reactions, the concentration of the colored form is dependent on the intensity of the radiation, the kinetics of the reverse reactions, and temperature of the reactions. The kinetics for the reverse reaction will normally be controlling, however some reverse reactions are thermally sensitive and are accelerated by irradiation or heating.

By the terms "photochromic compound," "photochromic substance" or "photochromic material," as used in the instant disclosure, is meant compounds, substances or materials which change their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomenon. In fact, such compounds have been widely used in various ways, as described above. Generally, these compounds change their color when exposed to ordinary sunlight and revert back to their original color upon removal thereof from the rays of the sun. Various other materials however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

I have discovered a group of photochromic materials which may be incorporated into various cyanoethylated cellulosic materials thereby forming the novel compositions of the present invention having the several advantages mentioned above.

These photochromic materials are admixtures of inorganic metal oxides. The admixtures generally consist of a primary of host inorganic metal oxide doped with a lesser or contaminating amount of another guest inorganic metal oxide. The admixtures which are contemplated as useful in the novel compositions of my invention are the following: $TiO_2$ doped with $Fe_2O_3$, $FeO$, $Cr_2O_3$, $CuO$, $NiO$, $MnO_2$ or $Mn_2O_3$; $Nb_2O_5$ doped with $Fe_2O_3$, $FeO$, $Cr_2O_3$, $CuO$, $V_2O_5$, $MnO_2$ or $Mn_2O_5$; $Al_2O_3$ doped with $Cr_2O_3$ or $V_2O_5$; $ZnO$ doped with $CuO$ or $V_2O_5$; $SnO_2$ doped with $CuO$; or $ZrO_2$ doped with $CuO$ or $NiO$. In regard to the $TiO_2$, the rutile form of the compound is sufficient, however, the anatase form containing at least 5% of the rutile material is preferred. These admixtures contain from about 0.01 to 5.0 mole percent of the doping guest oxide, preferably 0.1 to 2.0 mole percent, based on the number of moles of the host oxide.

These doped oxides are well known in the art and generally may be prepared by any applicable method. Various methods which may be used include those set out in the following articles. Williamson, Nature (London), 140, 238 (1937); McTaggert et al., J. Appl. Chem., 5, 643 (1955); Frydryck, Doctoral Thesis, Free University of Berlin (1961), and additionally the method set forth hereinbelow.

I have also discovered a second group of photochromic materials that may be employed in the present invention. The second group comprises admixtures of $TiO_2$ with a combination of two doping (guest) metal oxides. I have found that these mixtures of guest oxides, in admixture with $TiO_2$, exhibit a more pronounced effect in the color intensity of the products than either doping metal (guest) oxide used alone. For example, $TiO_2$ doped with $Fe_2O_3$ or $FeO$ and $NiO$, or $TiO_2$ doped with $Fe_2O_3$ or $FeO$ and $CuO$, result in a more intense color change than $TiO_2$ doped with $Fe_2O_3$, $FeO$, $NiO$ or $CuO$, alone. That is to say, a synergistic effect is observed wherein the results obtained utilizing a mixture of guest oxides is better than that obtained from either guest oxide alone or the mere additive results of both together. Here, again the rutile form of the host compound is satisfactory, but the anatase form containing at least 5% of the rutile material is preferred. When a combination of the different doping oxides are used, amounts ranging from 100:1 to 10:1, preferably 25:1 to 5:1, of the iron oxide to the nickel or copper oxide are satisfactory, the total amount of the mixed oxides still however, being within the range (in mole percent) specified above.

These doped admixtures of host and guest oxides, either, as such, or with combinations of doping guest oxides, may be prepared, among other methods, by slurrying a solution of the doping metal oxide salt, the guest metal oxide itself, or mixtures thereof, with the host metal oxide. The slurry is evaporated and ground, then calcined at a temperature between 400° and 1100° C. to give the active admixture. In the case of $TiO_2$, the host crystalline compound desired can be previously prepared, or starting the admixture preparation with anatase, the desired final proportion of rutile can be controlled by the length of time the admixture is calcined above the phase transition temperature (ca. 800° C.). The final active admixtures are not merely mechanical or physical blends, but are crystalline materials consisting of a host material matrix wherein is contained substitutionally or interstitially, the doping guest metal oxide.

I have also discovered another group of photochromic inorganic oxide admixtures which may be used in the compositions of the present invention. This third class of materials, in order of preference, is $TiO_2$ in admixture with $MoO_3$ or $WO_3$. These admixtures are produced in mole ratios of about 1 to 15 mole percent of $TiO_2$ to about 25 to 1 mole percent of $MoO_3$ or $WO_3$. The preferred mole ratios range from about 1:4 to about 12:1, respectively. The $TiO_2$ component may be in either the rutile, anatase, or mixed phase form, and in place of $TiO_2$ other metal oxide components may be used, such as, for example, $ZnO$, $ZrO_2$, $SnO_2$ and $GeO_2$ in the same mole ratio given above for $TiO_2$.

These two phase materials constituting the third class of photochromic materials are novel compounds and are prepared as described and claimed in the George L. Roberts and John A. Chopoorian copending application, Serial No. 239,159, filed concurrently herewith. In a typical procedure, the compounds are prepared by dissolving the $MoO_3$ or $WO_3$ in an aqueous basic solution and adding to this solution an acidified aqueous slurry or solution of the primary metal oxide component. After heating at up to 100° C. for several hours or longer, the desired active material is formed in very high yield, separated from the solvent, washed free of acid and dried.

Superficially taken, it would appear that the third class of materials are merely a mechanical or physical mixture of the two oxide components. However, these latter chemically prepared, coprecipitated materials are of extremely great photo-sensitivity in comparison to a mixture of their individual metal oxides. Additionally, X-ray evidence clearly indicates that the crystalline matrix of the $MoO_3$ or $WO_3$ has been completely altered. Although not wishing to be bound by any particular theory it is possible that this phenomena can be explained as follows. Since the photochromic color in these compounds is deep blue, the most likely theoretical alternatives as to the nature of this photochromic reaction is that a net electron delocalization to Mo or W takes place either by an inter- or intra-phase photo-initiated electron transfer from the second component of the active material. Because of the degradation of these Mo and W compounds at higher temperatures, it is preferred that the cyanoethylated cellulosic materials containing them be cast instead of molded, however, molding them is possible, although somewhat less practical than casting.

The cyanoethylated cellulosic materials employed in the formation of the novel compositions of the present invention may be prepared from the cellulose of wood pulp or wood fiber after removal of the lignin and resins therefrom. Additionally, α-cellulose flock, regenerated cellulose fibers such as viscose, cotton linters, and natural cellulose materials such as cotton, jute, ramie, and linen may be used in such forms as fibers, yarns, fabrics, raw stock, batting and the like. Additionally, the cellulosic material may be non-fibrous e.g. in the form of felted or webbed materials. The fibrous forms of the cellulose may be employed in woven or knitted condition. It is also within the scope of the present invention to employ methyl cellulose, ethyl cellulose and the like as the starting material.

Cyanoethylation of cellulosic materials is well known in the art and is generally carried out by reacting the natural or regenerated cellulosic material with acrylonitrile in various ways. The physical properties of the resultant products vary with the nature of the cellulosic material, its molecular weight, the method of treatment and the like. However, said properties are affected most noticeably by the extent to which the cellulosic material has been cyanoethylated.

The cyanoethylation of the cellulosic material is usually defined in one of two ways, i.e. either by its nitrogen content, expressed in weight percent of nitrogen, or by a decimal fraction representing the number of cyanoethyl groups introduced per anhydroglucose unit. This decimal fraction is usually referred to as the "degree of substitution." Complete cyanoethylation of cellulose generally corresponds to a nitrogen content of about 13.1% or slightly above, and a degree of substitution of about 3. A nitrogen content of at least 10% and a corresponding degree of substitution of about 2.3 is generally present in the most commonly available materials.

At low degrees of substitution, that is, a degree of substitution up to about 2, cyanoethylation does not greatly alter the solubility or the physical appearance of the cellulose, i.e the fibrous characteristics thereof are generally retained. However, as the degree of substitution increases progressively above 2, the fibrous characteristics of the cellulose gradually diminish and resemblances of the product to a thermoplastic resin become increasingly apparent. Additionally, the product develops a solubility in certain organic solvents which the cellulosic material previously did not have.

As mentioned above, substantially any cellulosic material can be utilized in the production of the novel compositions of the present invention. Cellulose, and some chemically related compounds, are structurally polymers of anhydroglucose, and different polymers are generally classed in terms of the number of anhydroglucose units in a molecule. Chemically, an anhydroglucose unit is a trihydric alcohol, one hydroxyl group being a primary hydroxyl and the other two being secondary. Celluloses are predominately 1 to 4 unit polymers, the number of polymerized units usually being referred to as the degree of polymerization.

As with any other polymer, each cellulosic polymer is a mixture of polymers of different molecular weight and it is the average degree of polymerization which determines the classification of the ultimate product. The cellulose used in the present invention generally have a degree of polymerization of at least about 2000, although those celluloses having degrees of polymerization below 2000 are also useful herein. The viscose rayons, for example, have a degree of polymerization of from about 250 to 350. Natural cotton has a degree of polymerization of about 850 to 1000 and many wood pulp derivatives have a degree of polymerization in excess of 1000. All these celluloses, however, may be used in the practice of the present invention.

The cyanoethylation procedures used to form the starting compositions of the present invention do not form part of the instant invention and any known procedure for achieving this result may be employed. One such method is shown for example, in U.S. Patent 2,332,049. Additional procedures are shown in the following U.S. patents: 2,375,847, 2,840,446, 2,786,736, 2,860,946, 2,812,999 and these patents are hereby incorporated herein by reference. In general the procedure for preparing the cyanoethylated celluloses involves reacting a cellulosic material with acrylonitrile in the presence of an alkali and precipitating and washing the resultant cyanoethylated product. Generally, the amount of acrylonitrile which is used is 10 to 20 times the amount of cellulosic material being treated. The particular alkali employed is not critical and such materials as potassium hydroxide and sodium hydroxide may be used. A good general procedure is to employ about 2.5 to about 7.0 weight percent of alkali, based on the weight of the cellulosic material. As mentioned above, however, the process for the production of the cyanoethylated material forms no part of the instant invention.

The amount of the inorganic metal oxide (photochromic material), in any instance, incorporated into the cyanoethylated cellulosic materials to form the novel compositions of the present invention, is not critical and depends materially upon the intensity of the color of the composition desired upon the irradiation thereof. Generally, however, it is necessary to incorporate at least about 1.0% and, usually up to 70%, by weight, of the photochromic material into the cyanoethylated cellulose, based on the weight of the cellulose. It is preferred however, that more than 20%, by weight, of the photochromic material be added.

The photochromic compound may be added to the cyanoethylated cellulose at any time. That is to say, the photochromic inorganic oxide compositions may be added during the cyanoethylation of the cellulosic material by merely incorporating into the cellulose, the acrylonitrile or reaction mixture, the photochromic compound. Additionally, the photochromic material may be added to the cyanoethylated cellulose per se by merely contacting the cyanoethylated cellulose with a solution of the photochromic compound. The cellulose either absorbs the compound or is blended with it and the solvent evaporates under mild heating conditions. This solvent addition technique may be employed for adding the photochromic material to the cyanoethylated cellulose in any form, i.e. that of a fiber, a fabric or the like, since the cyanoethylated cellulose, in any form, continues to possess the ability to absorb the photochromic material. The only limitation in regard to the addition of the photochromic material is that the addition may not be conducted at any time during which any material, substance, compound or condition exists which will neutralize the photochromic material and thereby nullify any reversible color-change phenomena that formerly existed therein. For example, the existence of excess quantities of acids or other functional compounds such as mercaptans and the like cannot be tolerated during the addition of the photochromic material.

When actual physical blending of the prepared cyanoethylated cellulose and photochromic substance is desired, known procedures such as utilizing a ball mill, hot rolls, emulsion blending techniques, Banbury mixers, Waring Blendors and the like are effective. Another procedure which may be employed is known as a devolatilization-extrusion method, wherein separate streams of solutions of the cyanoethylated cellulose and photochromic material are subjected to mixing, compounding, devolatilization and extrusion in commercially available devices. In the devolatilizer-extruder, the mixture is worked in a chamber under heat and vacuum so that new surfaces of the cellulose mixture are continuously and rapidly exposed to vacuum to remove the solvent before extruding the product. The term "devolatilization" as herein employed refers to the step in which the non-cellulosic volatile material is removed. The apparatus which simultaneously devolatilizes and extrudes the material comprises a chamber with one or more screws having a close tolerance with the wall for compounding the material in its passage therethrough, and at least one vacuum chamber for removing the volatile components of the feed. The action of working the material under the close tolerance of the screws not only intimately blends the mixture, but generates substantial heat which aids in the devolatilizing of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e., not under vacuum, wherein various volatiles or non-volatile modifiers, fillers, lubricants, stabilizers, plasticizers, colorants or the like, maye be incorporated into the novel compositions of this invention and extruded therewith.

The vacuum sections of the devolatilizer-extruder are heated to temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the two streams are introduced into the devolatilizer-extruder the increased temperature causes volatilization of the solvent therefrom. At the same time, because the volatile material is withdrawn or volatilized from solutions of polymer and photochromic material.

The novel compositions of the present invention, as mentioned above, may be cast, molded, etc. into various articles having a multitude of shapes. Various articles such as films cast on rigid substrates may be produced therefrom as well as various matrices useful in the production of electroluminescent devices. The products may also be used in textile blending pastes, as latex dispersions and as adhesives and coatings wherein the unique property of color change is useful. Also, the obvious use of fibers is evident wherein various fabrics can be woven, spun, etc., therefrom to produce cloth products which, when subjected to ultraviolet light, will also exhibit color changes.

The compositions of the present invention may further be modified by the addition of such materials as fillers, lubricants, plasticizers, colorants, etc. as mentioned above. It is also possible to lengthen the life of the compositions by incorporating various amounts of ultraviolet light absorbers into them or by coating the articles formed from the compositions, with a material containing an ultraviolet light absorber. When additives such as these are added, any conventional compound known to function as a UV absorber may be employed. Examples of such compounds are the 2-hydroxy benzophenones, e.g., 2,4-di-hydroxy benzophenone; the 2(2-hydroxyphenyl)benzotriazoles, e.g., 2(2-hydroxy-4-methoxyphenyl)-benzotriazole and the like. In this manner, the photochromic life of the inorganic oxide photochromic additive is lengthened by preventing an extraneous amount of ultraviolet light from coming into contact with the photochromic material. When absorbers of this type are added, amounts up to about 20%, by weight, based on the weight of the cyanoethylated cellulose, may be used.

The following examples are set forth for purposes of illustration only and are not to be construed as limitations on the present invention except as set forth in the appended claims. All parts and percentages are by weight unless otherwise noted.

Example 1

To 100 parts of a powdery, commercially available cyanoethylated cellulose (nitrogen content, 12%; degree of substitution, 2.7) are added 25 parts of a singly doped metal oxide, $TiO_2$ activated by 0.2% $Fe_2O_3$, by weight. The mixture is added to a ball mill and thoroughly admixed for about 1 hour. A suspension of the resultant admixture is prepared in acetone and the suspension is cast on a glass plate. The acetone is allowed to evaporate at room temperature. A film is formed, which when subjected to ultraviolet light, darkens to a tan color.

Example 2

To 100 parts of the cyanoethylated cellulose identified in Example 1 are added 20 parts of a doubly doped metal oxide, $TiO_2$ doped with 0.2% $Fe_2O_3$ and 0.02% $CuO$, by weight. The components are thoroughly admixed in a Waring Blendor and an acrylonitrile suspension of the resultant admixture is then formed. The suspension is cast on a stainless steel plate at 45° C. for 15 minutes. The resultant film darkens to deep tan when subjected to ultraviolet light of 400 m$\mu$ wavelength and reverts to its original color when the light source is removed.

Example 3

100 parts of the cyanoethylated cellulose identified in Example 1 and 30 parts of $TiO_2 \cdot 12WO_3$ (produced by reacting 1 mole of $TiO_2$ with 12 moles of $WO_3$) are charged to a tumbler-type mixer and allowed to thoroughly admix for 30 minutes. The powdered admixture is then heated on a preheated mold at 155° C. and 7500 p.s.i. pressure, for about 1 hour. The resultant molded article, when subjected to ultraviolet light, turns to a blue-green color.

Example 4

Following the procedure of Example 3, a molded article is produced from the cyanoethylated cellulose described therein and 27 parts, by weight, of $TiO_2$ activated with 0.2% $FeO$ and 0.02% $Ni$, by weight. The article darkens to a deep tan when subjected to sunlight.

Example 5

Into a suitable reaction vessel are added 300 parts of acrylonitrile, 2 parts of sodium hydroxide and 25 parts of $TiO_2 \cdot 6MoO_3$ (produced by reacting 1 mole of $TiO_2$ and 6 moles of $MoO_3$). To this mixture is then added 40 parts of water and 0.27 part of isopropylnaphthalene sodium sulfonate, as an emulsifier. Agitation of the contents of the vessel is continued for ½ hour at 20° C. and 25 parts of white cotton yarn are then added. The vessel is heated to 38° C. and the reaction mixture is thoroughly agitated for an additional hour. The sodium hydroxide is then neutralized with phosphoric acid and the yarn is washed with water three times. The nitrogen content thereof is 11.8% and the degree of substitution is 2.6. The yarn turns a deep blue when subjected to ultraviolet light of wavelength of 400 m$\mu$ and reverts to white upon removal of the light source therefrom.

Following the procedure of Example 1, various other photochromic inorganic oxide materials are added to the commercially available cyanoethylated cellulose. Examples 6 to 11 and 15 to 28 employed amounts equivalent to Example 1, while Examples 12 to 14 followed Examples 2 and 4. Examples 29 to 37 corresponded to the concentrations set forth in Example 3. The results are given in Table I below.

TABLE I

| Example | Activated With— | Color Change | Time Activation, Sec. |
|---|---|---|---|
| 6 | $TiO_2+FeO$ | Off-white to tan | 60 |
| 7 | $TiO_2+Cr_2O_3$ | Off-white to light tan | 1,800 |
| 8 | $TiO_2+CuO$ | do | 120 |
| 9 | $TiO_2+NiO$ | do | 120 |
| 10 | $TiO_2+MnO_2$ | do | 100 |
| 11 | $TiO_2+Mn_2O_5$ | do | 100 |
| 12 | $TiO_2+Fe_2O_3+NiO$ | Off-white to deep tan | 60 |
| 13 | $TiO_2+FeO+NiO$ | do | 60 |
| 14 | $TiO_2+FeO+CuO$ | Off-white to brown | 60 |
| 15 | $Nb_2O_5+Fe_2O_3$ | Off-white to grey | 1,200 |
| 16 | $Nb_2O_5+FeO$ | do | 1,200 |
| 17 | $Nb_2O_5+Cr_2O_3$ | do | 2,400 |
| 18 | $Nb_2O_5+CuO$ | do | 1,400 |
| 19 | $Nb_2O_5+V_2O_5$ | do | 2,400 |
| 20 | $Nb_2O_5+MnO_2$ | do | 1,500 |
| 21 | $Nb_2O_5+Mn_2O_5$ | do | 1,500 |
| 22 | $Al_2O_3+Cr_2O_3$ | do | 3,600 |
| 23 | $Al_2O_3+V_2O_5$ | do | 3,600 |
| 24 | $ZnO_2+CuO$ | do | 2,700 |
| 25 | $ZnO_2+V_2O_5$ | do | 2,700 |
| 26 | $SnO_2+CuO$ | Off-white to deep tan | 2,700 |
| 27 | $ZrO_2+CuO$ | Off-white to grey | 2,700 |
| 28 | $ZrO_2+NiO$ | do | 2,700 |
| 29 | $TiO_2 \cdot WO_3$ | Faint yellow to blue-green | 60 |
| 30 | $TiO_2 \cdot WO_3$ | Faint yellow to deep blue-green | 300 |
| 31 | $ZnO \cdot MoO_3$ | White to light blue / White to blue | 60 / 300 |
| 32 | $ZrO_2 \cdot MoO_3$ | White to light blue / White to blue | 60 / 300 |
| 33 | $ZrO_2 \cdot WO_3$ | Faint yellow to light blue-green | 60 |
| 34 | $SnO_2 \cdot MoO_3$ | White to light blue / White to blue | 60 / 300 |
| 35 | $SnO_2 \cdot WO_3$ | Faint yellow to light blue-green | 60 |
| 36 | $GeO_2 \cdot WO_3$ | do | 60 |
| 37 | $GeO_2 \cdot MoO_3$ | White to light blue / White to blue | 60 / 300 |

I claim:

1. A composition of matter consisting essentially of a cyanoethylated cellulosic material having uniformly dispersed throughout the body thereof from about 1.0% to 70%, by weight, based on the weight of said material, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ heat-reacted with an oxide selected from the group consisting of $MoO_3$ and $WO_3$, (H) ZnO heat-reacted with an oxide selected from the group consisting of $MoO_3$ and $WO_3$, (I) $ZrO_3$ heat-reacted with an oxide selected from the group consisting of $MoO_3$ and $WO_3$, (J) $SnO_2$ heat-reacted with an oxide selected from the group consisting of $MoO_3$ and $WO_3$, and (K) $GeO_2$ heat-reacted with an oxide selected from the group consisting of $MoO_3$ and $WO_3$.

2. A composition according to claim 1 containing, in addition to the inorganic photochromic material, up to about 20%, by weight, based on the weight of said material, of an ultraviolet light absorber.

3. A composition of matter consisting essentially of a cyanoethylated cellulosic material having uniformly dispersed throughout the body thereof from about 1.0% to 70%, by weight, based on the weight of said material, of an inorganic photochromic material selected from the group consisting of a (A) $TiO_2$ doped with an oxide selected from the group consisting of $FeO_2$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, and (F) $ZrO_2$ doped with an oxide selected from the group consisting of CuO and NiO.

4. A composition of matter consisting essentially of a cyanoethylated cellulosic material having uniformly dispersed throughout the body thereof from about 1.0% to 70%, by weight, based on the weight of said material, of an inorganic photochromic material selected from the group consisting of (G) $TiO_2$ heat-reacted with an oxide selected from the group consisting of $MoO_3$ and $WO_3$, (H) ZnO heated-reacted with an oxide selected from the group consisting of $MoO_3$ and $WO_3$, (I) $ZrO_2$ heat-reacted with an oxide selected from the group consisting of $MoO_3$ and $WO_3$, (J) $SnO_2$ heat-reacted with an oxide selected from the group consisting of $MoO_3$ and $WO_3$ and (K) $GeO_2$ heat-reacted with an oxide selected from the group consisting of $MoO_3$ and $WO_3$.

5. A composition of matter consisting essentially of a cyanoethylated cellulosic material having uniformly dispersed throughout the body thereof from about 1.0% to 70%, by weight, based on the weight of said material, of an inorganic photochromic material selected from the group consisting of (a) $TiO_2$ doped with a mixture of $Fe_2O_3$ and NiO, (b) $TiO_2$ doped with a mixture of $Fe_2O_3$ and CuO, (c) $TO_2$ doped with a mixture of FeO and NiO, and (d) $TiO_2$ doped with a mixture of FeO and CuO.

6. A composition according to claim 1 wherein the cyanoethylated cellulosic material is cyanoethylated cellulose.

7. A composition according to claim 3 wherein the cyanoethylated cellulosic material is cyanoethylated cellulose.

8. A composition according to claim 4 wherein the cyanoethylated cellulosic material is cyanoethylated cellulose.

9. A composition according to claim 5 wherein the cyanoethylated cellulosic material is cyanoethylated cellulose.

10. A composition according to claim 1 wherein the cyanoethylated cellulosic material is cotton.

11. A composition according to claim 3 wherein the cyanoethylated cellulosic material is cotton.

12. A composition according to claim 4 wherein the cyanoethylated cellulosic material is cotton.

13. A composition according to claim 5 wherein the cyanoethylated cellulosic material is cotton.

References Cited by the Examiner

UNITED STATES PATENTS

| 2,184,539 | 12/1939 | Wiggam. |
| 2,724,632 | 11/1955 | Weisberg _____ 106—169 |
| 2,944,912 | 6/1960 | Kopley. |
| 3,097,956 | 7/1963 | Saunders et al. |
| 3,197,664 | 7/1965 | Sentementes _____ 260—231 |

FOREIGN PATENTS 829,001 2/1960 Great Britain.

ALEXANDER H. BRODMERKEL, *Primary Examiner.*

D. J. ARNOLD, *Assistant Examiner.*